Patented Oct. 10, 1950

2,525,601

UNITED STATES PATENT OFFICE 2,525,601

MAGNETIC IMPULSE RECORD MEMBER

Hugh A. Howell, Valparaiso, Ind., assignor to The Indiana Steel Products Company, Valparaiso, Ind., a corporation of Indiana No Drawing. Application April 16, 1947, Serial No. 741,951

3 Claims. (Cl. 117—28)

This invention relates to a magnetic impulse record member comprising an elongated non-magnetic carrier having a ferromagnetic track formed thereon.

While my invention will be described in connection with the magnetic recording of sound, it will be understood that the invention is equally applicable to the recording of any magnetic impulses regardless of whether such impulses are to be reproduced as sound, or not.

In magnetic sound recorders it has been customary to use either a wire or a tape of ferromagnetic material as the magnetic sound record member. Such wires or tapes have been formed of high carbon steels and also of stainless steels and other alloys. In order to secure desirable magnetic properties and also non-corrodibility, stainless steel and other special alloys have been used, but the cost of manufacturing small diameter wires and thin tapes of such special alloys has been comparatively high.

It has also been proposed to provide sound record members formed of paper or other fibrous tape coated or impregnated with ferrous magnetic particles, such as particles of steel, iron, stainless steel, or of magnetic iron oxides. In general, however, composite tapes so formed, as well as wires or tapes formed of the ferromagnetic alloys heretofore used, have had a comparatively low coercive force, whereas it has now been found advantageous in the case of certain types of magnetic sound recorders to provide a record member having a relatively high coercive force.

In accordance with my present invention, I employ a carrier that may be made from non-magnetic material, such as paper, plastics, non-ferrous metals and the like, and incorporate into the carrier, or apply thereto, a ferromagnetic track comprising finely divided particles of oxyferrite containing $Fe_3O_4$ dispersed in sub-microscopic form in the oxyferrite, as matrix. As disclosed in my copending application Serial No. 731,721, filed February 28, 1947, the starting material for the preparation of the ferromagnetic material used in my present invention is an iron alloy of aluminum. The aluminum-iron alloy in crushed form is subjected to the dissolving action of a hot, aqueous solution of an alkali metal hydroxide, such as caustic soda, caustic potash or the like. The starting alloy may, for instance, be an alloy of aluminum and iron, having an aluminum content between 45 and 75% of aluminum by weight of the alloy, and preferably between 50 and 60%. The friable spongy material, containing less than 5% of aluminum by weight, resulting from the caustic solution treatment, after suitable processing, is ground in a suitable medium to form a paste for application to the non-magnetic carrier.

Ferromagnetic material prepared in accordance with the above described process consists essentially of oxyferrite containing finely dispersed, sub-microscopic particles of $Fe_3O_4$. Any agglomerated $Fe_3O_4$ present with the finely dispersed $Fe_3O_4$ should be considered as impurity. The effective oxygen in the dispersed $Fe_3O_4$ should not be more than about 5% by weight and the total oxygen ($O_2$), not more than 11% by weight of the ferromagnetic material. A minor percentage, possibly a few tenths of a percent of oxygen is dissolved in the iron itself. The term "oxyferrite" as used in this specification is identical with the definition of that substance to be found in the "Metals Handbook," 1939, page 392. That article shows that oxyferrite is a solid solution of oxygen and iron at oxygen contents up to about 0.2% and at temperatures below about 900° C.

The finely divided ferromagnetic material so prepared can then be applied in any of various ways to the support or carrier. For instance, the ferromagnetic material may be incorporated into a coating composition, such as a lacquer or the like, and applied to the surface of the supporting or carrying member by means of a fountain roll, or by spraying, by immersion or by means of brushes. The coating composition should contain a binder, such as a cellulose ester or ether or other cellulosic derivative, nylon, a vinyl compound, or any of the other synthetic plastics, or a gum or resin.

It is therefore an important object of this invention to provide a magnetic impulse record member having a ferromagnetic track of finely divided particles of oxyferrite containing $Fe_3O_4$.

It is a further important object of this invention to provide a magnetic sound record member comprising a carrier of non-magnetic material, such as paper, or other fibrous material, or a plastic material, provided with a ferromagnetic track of particles consisting of $Fe_3O_4$ well dispersed in an oxyferrite matrix.

Other and further important objects of this invention will be apparent from the following description and appended claims.

As previously stated, the ferromagnetic material used in the present invention may be prepared from an aluminum alloy of iron. An aluminum alloy of iron containing between 45 and 75% of aluminum and preferably between 50 and 60% aluminum is subjected in finely divided form, say finer than 40 mesh, and preferably finer than 80 mesh, to the action of a hot aqueous solution of a caustic alkali hydroxide, such, for instance, as a 10 to 50%, and preferably 25 to 35% by weight concentration of caustic soda. The hot aqueous caustic soda dissolves out the aluminum content of the alloy to leave a granular material in a friable, spongy state, that is largely composed of oxyferrite, as the matrix, with $Fe_3O_4$ in submicroscopic particles well dispersed throughout the matrix. The decomposition of the alloy is very rapid if a hot solution of caustic soda is used. Preferably, leaching is carried out at the boiling point of the solution, viz., from about 100 to 125° C., in order to reduce the time required to a minimum.

The resulting granular material is then immediately washed with water or with cold caustic soda solution followed by water washes to remove the greater part of the soluble aluminates.

The water washed material is then washed with alcohol to replace much of the water, and finally with a water-miscible organic solvent which is the organic solvent that is to be used in making up a coating composition from the material. The resulting material is then mixed with an additional amount of the organic solvent, a binder is added, and the mass is ball milled to provide a coating composition for application to the non-magnetic carrier, such as a paper tape.

The following example will serve to illustrate a preferred embodiment of my invention, including the preparation of the ferromagnetic material, the coating composition prepared therefrom, and the final magnetic impulse record member comprising a non-magnetic carrier coated with the coating composition so prepared.

*Example*

An aluminum-iron alloy having an aluminum content of 54.4% and an iron content of 45.6% was ground to pass a 60-mesh screen and the material that held on an 80-mesh screen was selected. 227 grams of the aluminum-iron powder so obtained were added, a little at a time, to an aqueous caustic alkali solution at its boiling temperature, or around 110° C. The caustic soda solution was prepared by dissolving 400 grams of caustic soda (NaOH) in 1200 grams of water, to produce a concentration of about 25% NaOH by weight. The reaction proceeded vigorously and was substantially complete in a matter of a few minutes.

After the reaction had substantially stopped, the excess of leachant was poured off from the residual material and the latter washed in cold water several times, or until the wash water was reasonably clear. As much excess water as possible was poured off and the material then washed with alcohol. The residual material should not be allowed to stand in the water solution more than 10 minutes before the start of the first alcohol wash.

Sufficient alcohol was added to cover the residual material, and the mass stirred well. As much liquid as possible was then drained off the material.

Next, an additional amount of alcohol, sufficient to more than cover the material, was added and the mass stirred while heating to a temperature of about 65° C. The liquid portion was again drained off and the material again washed with hot alcohol. After again draining off the excess liquid, acetone was added to the material and stirred thoroughly, after which the acetone was drained off and fresh acetone, containing about 5 to 6% of dissolved iodine was added. After stirring the batch thoroughly for one or two minutes, the excess liquid was again drained off.

In making up the coating composition, a sufficient amount of the acetone-washed material to be the equivalent of around 2000 grams of the dry reacted material was used. To this were added 1750 g. of acetone and 2450 g. of a modified vinyl acetate resin in a toluene solvent containing about 100 g. of resin solids. After stirring the mixture well it was put into a ball mill and the ball mill operated for 15 minutes. The cover to the ball mill was then removed to allow gas to escape, and, after being replaced, the ball mill was operated for two hours, opening the cover every half-hour to relieve gas. Ball milling was continued for an additional 28 hours, relieving gas as often as necessary.

The resulting composition is now ready, except for dilution, if desirable, with a further quantity of acetone, to be applied to the non-magnetic carrier, which may suitably be a paper tape ¼" or so in width and formed of some strong fiber such as kraft (sulphate paper pulp), rag, hemp or the like. The coating composition if prepared as above described contains about 20 parts of magnetic material to 1 part of resin solids by weight on a dry basis. The ratio should be as high as possible, but may vary from 5 to 1 to 30 to 1.

The coating composition is applied to the paper tape by any suitable coating equipment, such as a reverse roll coater. Preferably only one side of the tape is coated. After the coating has been applied, the solvent is allowed to evaporate, with or without the aid of heat and the coated tape is calendered or burnished by passage through burnishing rolls. This imparts a high, smooth finish to the coated side of the tape and densifies the coating. In its finished state the coating may have a thickness of from 0.1 to 1 mil, and preferably between 0.2 and 0.4 mil, with an overall thickness of the coated tape between 1.5 and 3.5 mils.

Instead of a vinyl acetate resin, other resins, plastics or gums may be used in various organic solvents for making up the coating composition. The following formulae indicate suitable coating compositions:

| | Parts by weight |
|---|---|
| Cellulose acetate: | |
| Magnetic material | 100 |
| Acetone | 150 |
| Cellulose acetate | 10 |
| Cellulose nitrate: | |
| Magnetic material | 100 |
| Amyl acetate | 150 |
| Cellulose nitrate | 8 |
| Ethyl cellulose: | |
| Magnetic material | 100 |
| Acetone | 75 |
| Isopropyl alcohol | 75 |
| Ethyl cellulose | 12 |
| Polystyrene: | |
| Magnetic material | 100 |
| Amyl acetate | 75 |
| Acetone | 75 |
| Polystyrene | 12 |
| Shellac: | |
| Magnetic material | 100 |
| Alcohol (denatured ethyl) | 150 |
| Orange shellac | 6 |

In preparing any of the above coating compositions, the magnetic material obtained from the leaching step is given a last wash in whatever water-miscible solvent is to be used in the particular composition selected. For example, if acetone is to be used, the last wash is made with acetone. After the plastic and the solvent are well mixed, the magnetic material is added in the form of a paste. The composition is then ball milled for from 30 to 60 hours to obtain a satisfactory particle size and uniform dispersion of solids.

Because of the ease with which the magnetic material of my invention oxidizes, a non-aqueous vehicle should be used in the coating composition. If a water vehicle is used, the iron of the magnetic material oxidizes to an oxide with the evolution of hydrogen gas. On the other hand, when a resin as the binder is used in an organic solvent, there appears to be a strong affinity between the resin and the magnetic material such that the resin-magnetic material can be rendered plastic with a very small proportion of organic solvent, such as acetone.

In its finished form, the magnetic impulse record member of my invention comprises a carrier of non-magnetic material, such as a paper tape, and a ferromagnetic track on the carrier comprising finely divided particles of oxyferrite, as the matrix, containing well-dispersed submicroscopic particles of $Fe_3O_4$. The total oxygen content of the magnetic material should not exceed about 11% by weight, nor more than 5% of aluminum. Usually the percentage of aluminum will be less than 1%. The record member has a coercive force in excess of 300 oersteds, and usually greater than 500 oersteds. Such high coercive force values are substantially higher than any heretofore obtained with iron oxide coatings.

I claim as my invention:

1. A magnetic impulse record member comprising a paper tape base having an adherent resinous coating of a resin and finely divided ferromagnetic material consisting of an oxyferrite matrix with well-dispersed, submicroscopic particles of $Fe_3O_4$, the effective oxygen in the dispersed $Fe_3O_4$ being not more than about 5% by weight and the total oxygen ($O_2$) being not more than 11% by weight of the ferromagnetic material, the coercive force value of said member being greater than 300 oersteds.

2. A magnetic impulse record member comprising a thin, flexible, non-magnetic carrier having an adherent coating of a binder and finely divided ferromagnetic material, the latter consisting of an oxyferrite matrix with well-dispersed, submicroscopic particles of $Fe_3O_4$, the effective oxygen in the dispersed $Fe_3O_4$ being not more than about 5% by weight and the total oxygen ($O_2$) being not more than 11% by weight of the ferromagnetic material, the coercive force value of said member being greater than 300 oersteds.

3. A magnetic impulse record member comprising a paper base having a burnished adherent coating of a binder and finely divided ferromagnetic material, the latter consisting of an oxyferrite matrix with submicroscopic particles of $Fe_3O_4$ well dispersed through said matrix, the effective oxygen in the dispersed $Fe_3O_4$ being not more than 5% by weight and the total oxygen ($O_2$) being not more than 11% by weight of the ferromagnetic material, said coating having a thickness between 0.2 and 0.4 mil and said member having a coercive force of over 300 oersteds.

HUGH A. HOWELL.

REFERENCES CITED

The following references are of record in the file of this patent:

UNITED STATES PATENTS

| Number | Name | Date |
|---|---|---|
| 1,847,860 | Best | Mar. 1, 1932 |
| 1,915,473 | Raney | June 27, 1933 |
| 2,402,694 | Tanner | June 25, 1946 |

FOREIGN PATENTS

| Number | Country | Date |
|---|---|---|
| 466,023 | Great Britain | Nov. 18, 1936 |

OTHER REFERENCES

Mellor, Comprehensive Treaties on Inorganic and Theoretical Chemistry, 1929, vol. 13, part 2, pp. 702, 704 and 705.

Yensen et al., Magnetic Aging of Iron, A. I. M. E., Iron and Steel Div., vol. 116, 1935, pp. 397–404.